(12) United States Patent
Kohno et al.

(10) Patent No.: US 7,264,839 B2
(45) Date of Patent: Sep. 4, 2007

(54) PROTEIN BEVERAGE

(75) Inventors: Mitsutaka Kohno, Tsukuba-gun (JP); Chiaki Miyazaki, Tsukuba-gun (JP)

(73) Assignee: Fuji Oil Company, Limited, Osaka (JP)

( * ) Notice: Subject to any disclaimer, the term of this patent is extended or adjusted under 35 U.S.C. 154(b) by 776 days.

(21) Appl. No.: 10/455,625

(22) Filed: Jun. 6, 2003

(65) Prior Publication Data

US 2004/0247766 A1 Dec. 9, 2004

(51) Int. Cl.
*A23L 2/38* (2006.01)

(52) U.S. Cl. .............. 426/598; 426/590; 426/656

(58) Field of Classification Search ........... 426/656, 426/590
See application file for complete search history.

(56) References Cited

U.S. PATENT DOCUMENTS 3,995,071 A * 11/1976 Goodnight et al. ......... 426/598
5,874,538 A * 2/1999 Kuwata et al. ............. 530/378
5,976,606 A * 11/1999 Koga et al. ................. 426/634
6,171,640 B1   1/2001 Bringe ....................... 426/656
6,303,178 B1 * 10/2001 Tsumura et al. ............ 426/654
6,566,134 B2   5/2003 Bringe ....................... 435/410
6,638,562 B1 * 10/2003 Saitoh et al. ............... 426/654
2001/0024677 A1  9/2001 Bringe ....................... 426/656

FOREIGN PATENT DOCUMENTS

WO     00/19839    4/2000

* cited by examiner

*Primary Examiner*—Anthony Weier
(74) *Attorney, Agent, or Firm*—Wenderoth, Lind & Ponack, L.L.P.

(57) ABSTRACT

A soybean protein beverage having an excellent taste and mouthfeel and high storage stability with preventing formation of a precipitate at a weak acidic region as well as its production process are shown. Said beverage utilizes as its protein source low-phytic acid β-conglycinin obtained by fractionating and purifying β-conglycinin which is a soybean protein fraction and further decomposing and removing phytic acid bound to the resultant β-conglycinin to increase the solubility at a weak acidic region.

4 Claims, 1 Drawing Sheet

—○— low-phytic acid β-conglycinin
—●— β-conglycinin
—■— conventional soybean protein isolate —○— low-phytic acid glycinin
—●— glycinin
—■— conventional soybean protein isolate

PROTEIN BEVERAGE

BACKGROUND OF THE INVENTION

The present invention relates to a beverage containing a soybean protein and a process for producing the same.

Soybeans are an excellent food in view of a protein nutritional source. A beverage is one of the desired forms for ingesting this protein. However, the use of a beverage for this purpose is limited because soybean milk forms a precipitate at a weak acidic region where high storage stability can be expected, while a generally acceptable taste can hardly be obtained at a neutral pH region. On the other hand, an acidic beverage comprising as a main ingredient a soybean protein isolate obtained from a soybean has a problem that the beverage has unsatisfactory drinkability, because a soybean protein isolate has a unique unpleasant smell or taste, and is liable to form an aggregate or precipitate at an acidic pH region, thereby requiring addition of a dispersant or stabilizer such as a polysaccharide, etc, for dispersing such an aggregate or precipitate, which results in increase in viscosity.

Heretofore, many methods have been proposed to fractionate β-conglycinin, which is one of main constituent components of a soybean protein, from a soybean protein. For example, in addition to experimental fractionation methods by Wolf, et al, Tang, et at, and Nagano et al, as well as a method of Wu et al (JAOCS, vol. 76, No. 3, p 285-293 (1999)) which is said to be industrialization of the above method of Nagano et al (J. Agric. Food Chem., vol. 40, p 941-944 (1992)), there are methods disclosed by JP 48-56843 A, JP 49-31843 A, JP 51-86149 A, JP 55-124457 A, JP 55-153562 A, JP 56-64755 A, JP 57-132844 A, JP 58-36345 A, JP 61-187755 A, etc.

U.S. Pat. No. 6,171,640 discloses the isolation of a protein from a soybean which is derived by breeding technique and has a high β-conglycinin content, the use of the isolated protein in the production of beverages or beverage powders, and the like.

Further, a soybean contains about 2% of phytic acid and it has been known that a soybean protein inclusive β-conglycinin forms a complex with phytic acid, which inhibits digestibility of the soybean protein (Liter et al, J. Food Sci., 52, 325, 1987). Furthermore, Yoshida et al (JP 2000-245340 A) reports that phosphate compounds inclusive such phytic acid cause unpleasant "heavy feeling" of the stomach and decomposition and removal of these phosphate compounds alleviate this unpleasant "heavy feeling" to improve drinkability of a soybean protein beverage.

SUMMARY OF THE INVENTION

The main object of the present invention is to provide a protein beverage which has high storage stability even containing a soybean protein at a high concentration, hardly causes precipitation at a weak acidic region, and has an excellent taste.

As a result of the present inventors' intensive study, it has been found that a protein fraction having improved solubility can be obtained by fractionation of components of a soybean protein, and further found that a material having further improved solubility and an excellent taste can be obtained by reducing phytic acid in the soybean protein, thereby making it possible to obtain an acidic protein beverage. Thus, the present invention has been completed.

That is, the present invention provides a protein beverage produced by using a soybean protein material which is obtained by fractionation of soybean components so that the material contains as a main component β-conglycinin, one of protein components of a soybean, with reducing phytic acid in a soybean. More specifically, the present invention provides:

(1) A protein beverage comprising a low-phytic acid soybean protein whose main component is β-conglycinin;

(2) The protein beverage according to the above (1), wherein the β-conglycinin content of the low-phytic acid soybean protein is 60% or more of the protein as determined in terms of a degree of staining of a protein band formed by SDS-polyacrylamide gel electrophoresis;

(3) The protein beverage according to the above (1), wherein the phytic acid content of the low-phytic acid soybean protein is 0.2% or less of the protein;

(4) The protein beverage according to the above (3), wherein the low-phytic acid soybean protein is obtained from a soybean protein whose main component is β-conglycinin by treating with a phytase;

(5) The protein beverage according to the above (1), wherein the low-phytic acid soybean protein is obtained from a soybean having a β-conglycinin content of 40% or more of the protein in seeds as determined in terms of a degree of staining of a protein band formed by SDS-polyacrylamide gel electrophoresis;

(6) The protein beverage according to the above (5), wherein the low-phytic acid soybean protein is that of the above (2);

(7) The protein beverage according to the above (5), wherein the low-phytic acid soybean protein is that of the above (3);

(8) The protein beverage according to the above (1), wherein the beverage has a pH within a weak acidic pH range; and (9) The protein beverage according to the above (1), wherein the beverage is subjected to heat sterilization under weak acidic conditions.

DETAILED DESCRIPTION OF THE PREFERRED EMBODIMENTS

Figure 1:
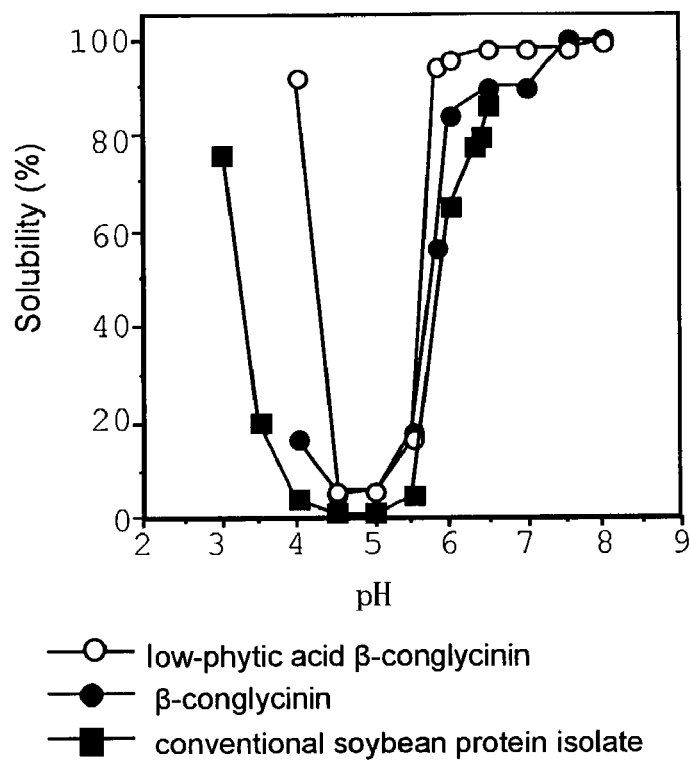
FIG. 1 is a graph illustrating solubility properties of low-phytic acid β-conglycinin and its related substances.

Hereinafter, preferred embodiments of the present invention will be illustrated.

The term "β-conglycinin" used herein refers to, among globular proteins generally called as globulins, a globulin corresponding to 7S of a sedimentation constant in ultracentrifugation analysis. In globulins, there are 2S, 7S, 11S and 15S according to their molecular weight distribution and it has been known that, among them, large amounts of 7S and 11S are contained in a storage protein of a legume such as a soybean.

On the other hand, Samoto et al. report that, in a protein derived from a soybean, there is a component having high affinity for polar lipid which constitutes a membrane inclusive cell membrane and that of a protein body, an oil body, etc. (lipid associated protein), and it occupies as much as about 35% of an industrially produced soybean protein isolate (Biosci. Biotechnol. Biochem., 62 (5), 935-940 (1998)). A lipid associated protein is a general name of a group of proteins whose main members are membrane proteins. In particular, it mainly includes proteins having molecular weight of 34 kDa, 24 kDa and 18 kDa, and contains about 10 to 12% of polar lipid which is extracted with a polar solvent, chloroform:ethanol=2:1. Further, when the above-mentioned lipid associated protein is obtained from an acid precipitated globulin with sodium sulfate precisely, it is present in an amount of about 30 to 35% in the acid precipitated globulin (supra Biosci. Biotechnol. Biochem., 62 (5), 935-940 (1998)). Furthermore, in the solids of the acid precipitated globulin, polar lipid which is extracted with chloroform:methanol=2:1 (V/V) is present in an amount of 3 to 4%. Since a lipid associated protein contains 10 to 12% of polar lipid as mentioned above, it is considered that polar lipid (hereinafter, sometimes, abbreviated to "chlometha lipid") is localized in the lipid associated protein in an acid precipitated globulin, and 10 times of the weight of chlometha lipid corresponds to the weight of a lipid associated protein, provided that this conversion of the amount of chlometha lipid into the amount of a lipid associated protein is applicable only to a material whose lipid associated protein has undergone defatting with hexane, etc. In case that a material does not undergo the extraction with hexane, etc., the conversion is applicable after defatting the material with hexane. Each fraction of β-conglycinin and glycinin is accompanied by a lipid associated protein, and a purity thereof determined by SDS-polyacrylamide gel electrophoresis is a value including the lipid associated protein and is higher than the actual purity of β-conglycinin or glycinin. The corrected purity can be calculated as shown in EXAMPLES hereinafter.

In the present invention, a fraction having a high β-conglycinin content fractionated from a soybean protein is used as a main component. For obtaining a fraction having a high β-conglycinin content from a soybean protein, first, glycinin (11S globulin) is removed. For removing it, in addition to the above-mentioned method of Wu et al, there may be used any fractionation methods such as the method of Thahn and Shibasaki (Thahn, V. H. and Shibasaki, K., J. Agric. Food Chem., 24, 117, 1976) which is currently widely employed as a fractionation method of respective globulin components as well as other methods including the method so-called cold-insoluble fraction (CIF) by cryo-precipitation (Briggs, D. R., and Mann, R. L., Cereal Chem., 127, 243, 1950), the fractionation method by addition of 0.1 N calcium chloride described by Wolf, et al (Wolf, W. J., and Sly, D. A., Cereal Chem., 44, 653, 1967), and the like. After removing glycinin by any of the above-mentioned methods, β-conglycinin is fractionated according to a conventional process for preparing a soybean protein isolate.

At this moment, even if a reducing agent, which is used in the above-mentioned methods, is not used, a β-conglycinin fraction having sufficient purity for use in the present invention can be obtained and, in case of using for a protein beverage, a fraction which does not contain a reducing agent can be expected to be of wider use. Further, the solubility at a weak acidic region (i.e., at pH 3 to 4.5) of a fraction can be improved by reacting the resultant fraction whose main component is β-conglycinin with an enzyme having an activity of decomposing phytic acid such as a phytase or a phosphatase or an enzyme preparation thereof to decompose and remove phytic acid.

As a method for fractionating such a low-phytic acid β-conglycinin (soybean protein) wherein a phytic acid content is reduced, it is possible to carry out removal of glycinin and reduction of phytic acid, simultaneously, by directly reacting a soybean protein with an enzyme having an activity of decomposing phytic acid such as a phytase or a phosphatase.

Alternatively, it is possible to fractionate a soybean protein into a β-conglycinin-rich soluble fraction and a glycinin-rich insoluble fraction precisely by warming a solution containing the soybean protein to 30 to 75° C. at pH 3.8 to 6.8 (WO 02/28189). In this case, enzymatic treatment with an enzyme having an activity of decomposing phytic acid such as a phytase or a phosphatase is also conducted prior to or after the fractionation.

Desirably, soybean protein to be used for the present invention has a such protein composition that the proportion of β-conglycinin to glycinin is 60% or more, preferably 70% or more.

Further, as a protein source for a protein beverage, it is also desirable to provide a protein material whose main component is a soybean protein isolate, which is obtained by using a soybean derived by breeding technique and having β-conglycinin content of 40% or more, preferably 50% or more of the total amount of protein in the seeds, and further reducing a phytic acid content to 0.2% or less based on the protein.

Preferably, the beverage of the present invention contains 1 to 10%, more preferably, 5% or less of the low-phytic acid β-conglycinin. When the beverage contains the low-phytic acid β-conglycinin in an amount of more than 10%, viscosity is increased, which adversely affects drinkability. This is not desired.

The beverage is preferably at pH 3.0 to 4.5, more preferably at pH 3.5 to 4.0 because, when pH is too low, an acidic taste becomes too much, which adversely affects drinkability and, when pH is too high, storability is deteriorated.

In the production of the beverage, sugar and fruit juice may be added to enhance palatability. In addition, fermented milk may be added to provide lactic acid fermentation flavor to the beverage. However, when fermented milk is used, a precipitate may be formed. In such a case, preferably, a known dispersant or stabilizer, for example, a water-soluble soybean polysaccharide, high methoxylpectin, etc, alone or in combination thereof, may be added to disperse the protein.

The dispersant or stabilizer is suitable in an amount of 10 to 50% of the protein and, in view of a taste of the dispersant or stabilizer, 10 to 30% is preferred. For example, both water-soluble soybean polysaccharide and high methoxylpectin can be used in combination and the ratio of a water-soluble soybean polysaccharide:high methoxylpectin is 9:1 to 1:1 and, in view of thickening properties of high methoxylpectin, preferably 9:1 to 8:1.

Further, for producing the beverage of the present invention, in addition to the soybean protein of the present invention, other protein materials can be incorporated. Furthermore, there can be used known materials such as fats and oils, saccharides, water, flavors, seasonings, etc. The beverage of the present invention can be produced according to a per se known process, for example, by mixing required raw materials, homogenizing, sterilizing at 80° C. or higher, preferably 90° C. or higher, and the like.

EXAMPLES

The following examples further illustrate the present invention in detail but are not to be construed to limit the scope of the present invention.

SDS-polyacrylamide gel electrophoresis used herein was conducted according to the method of Laemmli (Nature, 227, 680 (1970)) with a gradient gel at the gel concentration of 10 to 20%. The applied amount was 10 μg.

Phytic acid was measured according to the method of Alii Mohamed (Cereal Chemistry, 63, 475-478, 1986).

Chlometha lipid was measured by adding about 50-fold of a mixture chloroform and methanol (2:1 V/V) to a dried sample, followed by extraction under reflux. Chlomatha lipid was expressed as a ratio of the extracted solids to the total solids of the sample.

Purity (SPE (SDS-Polyacrylamide gel Electrophoresis) basis, %) The migration pattern obtained by the above-mentioned SDS-polyacrylamide gel electrophoresis was measured with a densitometer and the purity was expressed by the ratio of the area of the corresponding fraction to the total area (SPE basis). The β-conglycinin content used herein is a total amount of α, α' and β subunits, and the glycinin content is the total amount of acidic polypeptides (A) and basic polypeptides (B).

The amounts of β-conglycinin and glycinin used herein are expressed by SPE basis unless otherwise stated. When the coexisting lipid associated protein is taken into consideration in addition to β-conglycinin and glycinin, the corrected purity is calculated by the following equation.

That is, a lipid associated protein which corresponds to 10 times as much as chlrometha lipid is present in addition to β-conglycinin and glycinin in a sample, the corrected purity is calculated as a purity based on the total protein including the lipid associated protein as well as β-conglycinin and glycinin as follows:

Corrected purity (%)=

(100(%)−chlometha lipid(%)×10)×$A$(%)/100 wherein A is a purity (%) (SPE basis) of a sample.

Preparation 1

Preparation of Low-Phytic Acid β-conglycinin (1)

Water was added to a defatted soybean in the weight ratio of 10(water):1 (soybean) and stirred for 1 hour with adjusting pH at 7.0. The resultant mixture was centrifuged (4,000 r.p.m., 20° C. for 10 minutes), and the resultant defatted soybean milk was adjusted to pH 6.4, allowed to stand at 4° C. overnight, and centrifuged (4,000 r.p.m., 4° C. for 10 minutes). The resultant supernatant was adjusted to pH 4.5, and centrifuged again (4,000 r.p.m., 4° C. for 10 minutes) to recover a precipitate as β-conglycinin. Four-fold of water was added to the β-conglycinin precipitate and pH thereof was adjusted to 6.0. To this was added a phytase (phytase NOVO L, manufactured by Novo Industries) in an amount 0.2% based on the protein and the reaction was carried out at 40° C. for 1 hour. The reaction mixture was adjusted to pH 5.0 and then centrifuged (4,000 r.p.m., 20° C. for 10 minutes) to remove whey fraction. After addition of water to the resultant precipitate, the mixture was neutralized to pH 7.0, sterilized and spray-dried to obtain a low-phytic acid β-conglycinin. The low-phytic acid β-conglycinin was subjected to SDS-polyacrylamide gel electrophoresis and a degree of staining of a stained band of protein was measured to determine purity (SPE basis) of 71.2%. Further, the phytic acid content was 0.05% based on the protein, thereby confirming that phytic acid was thoroughly decomposed and removed.

Preparation 2

Preparation of Low-Phytic Acid β-conglycinin (2)

Water was added to a defatted soybean in the weight ratio of 10(water):1 (soybean) and stirred for 1 hour with adjusting pH at 7.0. The resultant mixture was centrifuged (4,000 r.p.m., 20° C. for 10 minutes), and the resultant defatted soybean milk was adjusted to pH 6.0. To this was added a phytase (phytase NOVO L, manufactured by Novo Industries) in an amount 0.2% based on the protein and the reaction was carried out at 40° C. for 1 hour. The reaction mixture was adjusted to pH 6.2 and then centrifuged (4,000 r.p.m., 20° C. for 10 minutes). The resultant supernatant was adjusted to pH 5.0, and centrifuged again (4,000 r.p.m., 20° C. for 10 minutes) to recover a precipitate. Water was added thereto and the mixture was neutralized to pH 7.0, sterilized and spray-dried to obtain a low-phytic acid β-conglycinin. The low-phytic acid β-conglycinin was subjected to SDS-polyacrylamide gel electrophoresis and a degree of staining of a stained band of protein was measured to determine purity (SPE basis) of 78.6%. Further, the phytic acid content was 0.05% based on the protein, thereby confirming that phytic acid was thoroughly decomposed and removed.

Preparation 3

Water was added to a defatted soybean in the weight ratio of 10(water):1 (soybean) and stirred at room temperature for 20 minutes without adjusting pH. Then, the mixture was adjusted to pH 5.0, warmed to 40° C. and maintained at this temperature for 30 minutes. The mixture was adjusted to pH 5.7, centrifuged (4,000 r.p.m., 20° C. for 10 minutes). To the resultant supernatant was added a phytase (phytase NOVO L, manufactured by Novo Industries) in an amount 0.2% based on the protein and the reaction was carried out at 40° C. for 1 hour. The reaction mixture was adjusted to pH 5.0 and centrifuged again (4,000 r.p.m., 20° C. for 10 minutes) to recover a precipitate. Water was added thereto and the mixture was neutralized to pH 7.0, sterilized and spray-dried to obtain a low-phytic acid β-conglycinin. The low-phytic acid β-conglycinin was subjected to SDS-polyacrylamide gel electrophoresis and a degree of staining of a stained band of protein was measured to determine purity (SPE basis) of 97.0%. Further, the phytic acid content was 0.05% based on the protein, thereby confirming that phytic acid was thoroughly decomposed and removed.

Comparative Preparation 1

Preparation of β-Conglycinin

Water was added to the β-conglycinin precipitate in Preparation 1 and the mixture was neutralized to pH 7.0, followed by sterilization and spray drying to obtain a β-conglycinin powder. Purity (SPE basis) of this β-conglycinin was 71.4% as determined by measurement of the degree of staining in SDS-polyacrylamide gel electrophoresis, thereby confirming that it had sufficient purity for withstanding the following tests. Further, when the phytic acid content was measured, it was 1.74% based on the protein.

Comparative Preparation 2

Preparation of Glycinin

The precipitate obtained after allowing the supernatant to stand at 4° C. overnight and centrifuging (4,000 r.p.m., 4° C. for 10 minutes) in Preparation 1 was recovered and water was added thereto. The mixture was neutralized to pH 7.0, sterilized and spray-dried to obtain glycinin. Purity (SPE basis) of glycinin thus obtained was 85.7% as determined by SDS-polyacrylamide gel electrophoresis, thereby confirming that it had sufficient purity for withstanding the following tests.

Comparative Preparation 3

Preparation of Low-Phytic Acid Glycinin

The precipitate obtained after allowing the supernatant to stand at 4° C. overnight and centrifuging (4,000 r.p.m., 4° C. for 10 minutes) in Preparation 1 was recovered and water was added thereto. The mixture was adjusted to pH 6.0. To this was added a phytase (phytase NOVO L, manufactured by Novo Industries) in an amount 0.2% based on the protein and the reaction was carried out at 40° C. for 1 hour. The reaction mixture was neutralized to pH 7.0, sterilized and spray-dried to obtain low-phytic acid glycinin. Purity (SPE basis) of the low-phytic acid glycinin thus obtained was 83.9% as determined by SDS-polyacrylamide gel electrophoresis, and the phytic acid content was 0.04% based on the protein, thereby confirming that the phytic acid was thoroughly decomposed and removed.

Comparative Preparation 4

Preparation of Conventional Soybean Protein Isolate

The supernatant obtained from the defatted soybean in Preparation 1 was adjusted to pH 4.5 and centrifuged (4,000 r.p.m., 20° C. for 10 minutes) to recover a precipitate. Water was added to the precipitate, neutralized to pH 7.0, sterilized and spray-dried to obtain a conventional soybean protein isolate.

Comparative Evaluation 1

Solubility properties of each fractionated product and phytic acid decomposed and removed fraction By using each of the spray-dried products of Preparation 1 and Comparative Preparations 1 to 4, 5% (w/w) sample solution was prepared and its pH was adjusted with hydrochloric acid. The solution was centrifuged at 12,000 r.p.m. for 10 minutes to obtain a supernatant. The ratio of the amount of protein in the supernatant to the total amount of protein was calculated. Solubility properties of the low-phytic acid β-conglycinin, β-conglycinin and conventional soybean protein isolate are shown in FIG. 1 and those of the low-phytic acid glycinin, glycinin and conventional soybean protein isolate are shown in FIG. 2.

Figure 2:
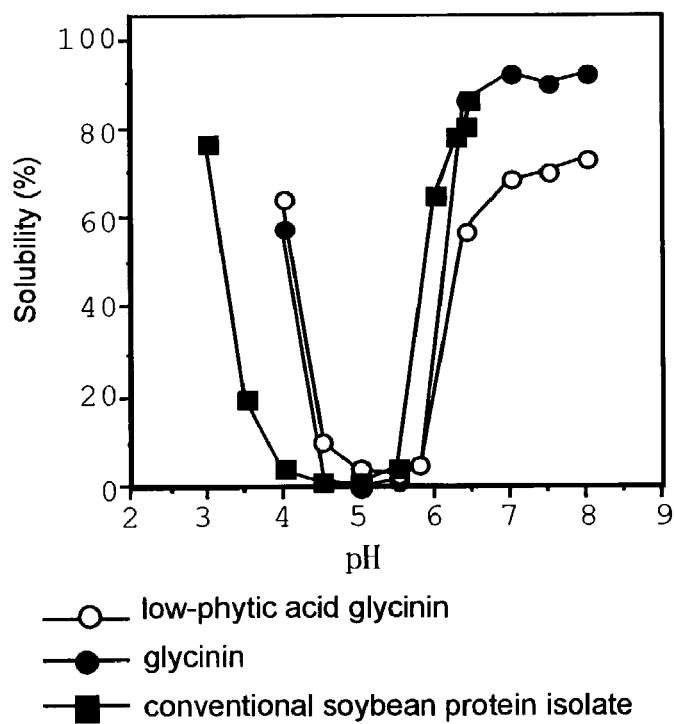
FIG. 2 is a graph illustrating solubility properties of glycinin related substances.

As seen from FIG. 1, solubility properties of the low-phytic acid β-conglycinin, wherein phytic acid is decomposed and removed, is greatly improved at about pH 4.0, i.e., the pH region of general acidic beverages. Further, a precipitate formed at pH 4.5 to 5.5, at which a precipitate of the low-phytic acid β-conglycinin is formed by isoelectric precipitation, is easily dispersible and a uniform dispersion can be formed by weak stirring. Furthermore, a dispersion suitable for a beverage without problems such as coarse mouthfeel, etc., can be obtained by using the above-mentioned dispersant.

In contrast to this, a precipitate formed from β-conglycinin or conventional soybean protein isolate to which phytic acid is bound cannot be easily dispersed and has considerable coarse mouthfeel.

Regarding glycinin, improvement of solubility properties cannot be found regardless of the presence or absence of phytic acid, and a precipitate formed by isoelectric precipitation has inferior dispersibility and has considerable coarse mouthfeel.

Example 1

According to the formulation shown in Table 1, a beverage was prepared by using the low-phytic acid β-conglycinin obtained in Preparation 2. The low-phytic acid β-conglycinin and sugar were dissolved in water and the fruit juice was added to the mixture. The mixture was adjusted to pH 3.7 with the 50% acid solution and homogenized with a high pressure homogenizer (manufactured by APV) at 150 kg/cm². Then, the flavor was added and the mixture was heated up to 95° C. and then cooled.

TABLE 1

| Ingredients | parts by weight |
| --- | --- |
| Law-phytic acid β-conglycinin | 3 |
| Granulated sugar | 7 |
| Grape fruit juice | 2 |

TABLE 1-continued

| Ingredients | parts by weight |
| --- | --- |
| 50% acid solution (citric acid:malic acid = 2:1) | 1 |
| Grape fruit flavor | 0.2 |
| Water | 86.8 |

The beverage thus prepared has a fresh palatable taste with less soybean flavor.

Comparative Example 1

According to the same manner as that described in Example 1, a beverage was prepared except that the β-conglycinin obtained in Comparative Preparation 1 was used instead of the low-phytic acid β-conglycinin. As a result, as seen from Table 2, the β-conglycinin was insolubilized and the beverage was hardly ingested. Further, the beverage had bad smell and taste. The beverage of this Comparative Example was inferior to the beverage of Example 1.

TABLE 2

|  | pH | one week ppt. | two weeks ppt. | three weeks ppt. | four weeks ppt. |
| --- | --- | --- | --- | --- | --- |
| Low-phytic acid β-conglycinin | 3.8 | − | − | ± | ± |
| β-Conglycinin | 3.8 | + | + | + | + |

−: no precipitate is formed.
±: a precipitate is slightly formed.
+: a precipitate is formed.

Example 2 and Comparative Example 2

According to the formulation shown in Table 3, a beverage was prepared by using the low-phytic acid α-conglycinin obtained in Preparation 2. The soybean protein and liquid sugar was dissolved in water and to the solution was added a solution of water-soluble soybean polysaccharide and pectin prepared by dissolving them in warm water. The mixture was homogenized with a high pressure homogenizer at 150 kg/cm². To this were added the fruit juice, the fermented milk, the colorant and flavor and the mixture was adjusted to pH 3.9 with the solution of citric acid and malic acid. The mixture was sterilized by heating up to 95° C. and packed in a package, while it was hot.

TABLE 3

| Ingredients | Composition parts by weight |
| --- | --- |
| Low-phytic acid β-conglycinin | 3.3 |
| Liquid sugar | 10.7 |
| Water-soluble soybean polysaccharide | 0.8 |
| Pectin | 0.2 |
| 1/5 Conc. apple juice | 1.0 |
| Colorant | 0.1 |
| Fermented milk | 2.0 |
| 50% acid solution (citric acid:malic acid = 2:1) | 0.7 |
| Flavor | 0.4 |
| Water | 80.9 |
| Total | 100.0 |

The beverage thus prepared had a fresh and palatable taste with milk taste and less soybean flavor. When samples of the beverage were stored in incubators at 5° C., 20° C. and 35° C. for 1 month, respectively, they were maintained in a good state without forming a precipitate. Further, even if the beverage was stored at 5° C. for 3 months, its taste was not deteriorated. As Comparative Example, a beverage was prepared according to the same manner as that in Example 2 except that powdered soybean protein isolate ("Fujipro-E" manufactured by Fuji Oil Company, Limited) was used instead of the low-phytic acid β-conglycinin. As a result, the beverage of Comparative Example had bad smell and taste and had bad compatibility with the fruit juice. The taste of the beverage of Comparative Example was inferior to that of Example 2. Further, the beverage of Comparative Example formed a precipitate on the third day of storage.

Example 3 and Comparative Example 3

According to the same manner and formulation as those in Example 2, beverages were prepared by using the low-phytic acid β-conglycinin obtained in Preparation 2 and β-conglycinin Comparative Preparation 1 with varying pH and further with and without addition of water-soluble soybean polysaccharide and pectin as a dispersant. Then, the formation of a precipitate and coarse mouthfeel of respective beverages were evaluated. The results are shown in Table 4. As seen from Table 4, in case of using the low-phytic acid β-conglycinin, a satisfactory beverage was obtained at pH 3.6 even without the dispersant. Further, a beverage having no coarse mouthfeel was prepared at pH 3.9, though a little precipitate was formed. When the dispersant was used, a beverage without coarse mouthfeel was prepared at pH 3.6 to 4.3. On the other hand, when β-conglycinin was used without the dispersant, the separation and aggregation were caused and coarse mouthfeel was recognized. Further, even if the dispersant was added, a satisfactory beverage was not prepared at pH 4.3.

TABLE 4

| | pH | Low-phytic acid β-conglycinin | | Soybean protein isolate | |
|---|---|---|---|---|---|
| | | ppt. | coarse mouth-feel | ppt. | coarse mouth-feel |
| With dispersant | 3.6 | − | − | − | − |
| | 3.9 | − | − | ± | ± |
| | 4.3 | ± | − | + | + |

TABLE 4-continued

| | pH | Low-phytic acid β-conglycinin | | Soybean protein isolate | |
|---|---|---|---|---|---|
| | | ppt. | coarse mouth-feel | ppt. | coarse mouth-feel |
| Without dispersant | 3.6 | − | − | ++ | ++ |
| | 3.9 | ± | − | ++ | ++ |
| | 4.3 | ++ | + | ++ | ++ |

Precipitation
−: no precipitate was formed. ±: a precipitate was slightly formed. +: a precipitate was formed. ++: a significant amount of a precipitate was formed.

Coarse Mouthfeel
−: no coarse mouthfeel ±: a little coarse mouthfeel +: a coarse mouthfeel ++: remarkable coarse mouthfeel As described hereinabove, the present invention makes it possible to obtain a soybean protein beverage having good taste and storability with maintaining a high protein content.

What is claimed is:

1. An acidic protein beverage comprising a low-phytic acid soybean protein whose main component is β-conglycinin, wherein the β-conglycinin content of the low-phytic acid soybean protein is 60% or more of the protein as determined in terms of a degree of staining of a protein band formed by SDS-polyacrylamide gel electrophoresis, the phytic acid content of the low-phytic acid soybean protein being 0.2% or less of the protein, and the beverage having a pH of 3.0 to 4.5.

2. The protein beverage according to claim 1, wherein the low-phytic acid soybean protein is obtained from a soybean protein whose main component is β-conglycinin by treating with a phytase.

3. The protein beverage according to claim 1, wherein the low-phytic acid soybean protein is obtained from a soybean having a β-conglycinin content of 40% or more of the protein in seeds as determined in terms of a degree of staining of a protein band formed by SDS-polyacrylamide gel electrophoresis.

4. The protein beverage according to claim 1, wherein the beverage is subjected to heat sterilization.

* * * * *